US 10,661,970 B2

(12) United States Patent
Yamashita

(10) Patent No.: US 10,661,970 B2
(45) Date of Patent: May 26, 2020

(54) VACUUM HEAT-INSULATING CONTAINER

(71) Applicant: TOYOTA JIDOSHA KABUSHIKI KAISHA, Toyota-shi, Aichi-ken (JP)

(72) Inventor: Osamu Yamashita, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 52 days.

(21) Appl. No.: 15/799,172

(22) Filed: Oct. 31, 2017

(65) Prior Publication Data

US 2018/0141740 A1 May 24, 2018

(30) Foreign Application Priority Data

Nov. 18, 2016 (JP) ................................ 2016-224993

(51) Int. Cl.
*B65D 81/38* (2006.01)
*A47J 41/02* (2006.01)

(52) U.S. Cl.
CPC ........ *B65D 81/3841* (2013.01); *A47J 41/022* (2013.01)

(58) Field of Classification Search
CPC ...... A47J 41/0072; A47J 41/02; A47J 41/022; B65D 81/3837; B65D 81/38; B65D 81/3869; B65D 81/3841
USPC ...... 220/592.27, 592.16, 592.28, 444, 10, 9, 220/23.87, 669, 23.91, 657, 592.17, 623, 220/608; 215/12.2, 13.1
See application file for complete search history.

(56) References Cited

U.S. PATENT DOCUMENTS

| | | | | | |
|---|---|---|---|---|---|
| 1,172,247 | A | * | 2/1916 | Anders | A47J 41/02 215/12.1 |
| 1,260,046 | A | * | 3/1918 | Recker | A47J 41/02 215/12.1 |
| 1,281,966 | A | * | 10/1918 | Irwin | A47J 41/02 215/12.1 |
| 1,352,844 | A | * | 9/1920 | Smith | A47J 41/024 215/12.1 |

(Continued)

FOREIGN PATENT DOCUMENTS

| FR | 7416 | 7/1907 |
|---|---|---|
| GB | 2 434 440 A | 7/2007 |
| JP | 2011-219125 A | 11/2011 |

OTHER PUBLICATIONS

Communication dated Feb. 19, 2018 from the European Patent Office in counterpart Application No. 17199560.8.

*Primary Examiner* — J. Gregory Pickett
*Assistant Examiner* — Tia Cox
(74) *Attorney, Agent, or Firm* — Sughrue Mion, PLLC

(57) ABSTRACT

Provided is a vacuum heat-insulating container including an outer cylinder having a bottom and an inner cylinder having a bottom and disposed inside the outer cylinder, with a vacuum space formed between the outer cylinder and the inner cylinder. The inner cylinder and the outer cylinder are disposed such that an opening plane of the inner cylinder is located outward of an opening plane of the outer cylinder. The outer cylinder has a first annular wall. The inner cylinder has a second annular wall. The vacuum heat-insulating container further includes an annular sealing member that is made of an elastic body having a lower coefficient of heat transfer than the outer cylinder and the inner cylinder, and that is squeezed between the first annular wall and the second annular wall so as to seal the vacuum space.

4 Claims, 6 Drawing Sheets

(56) References Cited

U.S. PATENT DOCUMENTS

| | | | | |
|---|---|---|---|---|
| 2,666,979 A | | 1/1954 | Van Dusen | |
| 3,760,971 A | | 9/1973 | Sterrett | |
| 3,863,794 A | * | 2/1975 | Hata | A47J 41/022 |
| | | | | 215/12.2 |
| 6,626,326 B2 | * | 9/2003 | Murakami | B65D 81/3881 |
| | | | | 220/23.87 |
| 6,648,168 B2 | * | 11/2003 | Fujii | A47J 41/0077 |
| | | | | 220/592.21 |
| 7,005,167 B2 | * | 2/2006 | Baba | A47J 41/0077 |
| | | | | 428/34.4 |
| 9,585,501 B1 | * | 3/2017 | Hamelink | A47G 19/2288 |
| 2007/0295684 A1 | * | 12/2007 | Fujii | A47J 41/026 |
| | | | | 215/12.1 |
| 2008/0190942 A1 | * | 8/2008 | Fujii | A47J 41/0077 |
| | | | | 220/592.27 |
| 2013/0213978 A1 | * | 8/2013 | Libourel | A47J 41/02 |
| | | | | 220/592.27 |

* cited by examiner

VACUUM HEAT-INSULATING CONTAINER

INCORPORATION BY REFERENCE

The disclosure of Japanese Patent Application No. 2016-224993 filed on Nov. 18, 2016 including the specification, drawings and abstract is incorporated herein by reference in its entirety.

BACKGROUND

1. Technical Field

The present disclosure relates to a vacuum heat-insulating container.

2. Description of Related Art

A vacuum heat-insulating container is known in which an inner cylinder having a bottom is disposed inside an outer cylinder having also a bottom, so that a vacuum space is formed between the inner cylinder and the outer cylinder. Japanese Patent Application Publication No 2011-219125 describes such a vacuum heat-insulating container, in which a metal inner cylinder and a metal outer cylinder are integrally joined together at an opening.

SUMMARY

If the inner cylinder and the outer cylinder are integrally joined together at the opening as in the vacuum heat-insulating container described in JP 2011-219125 A, heat of the inner cylinder is conducted to the outer cylinder, so that the vacuum heat-insulating container may fail to fully exhibit its heat insulation property. Moreover, in the case where there is a large temperature difference between the inner cylinder and the outer cylinder, such as when the inner cylinder is heated to a high temperature, a difference between the dimensional change due to thermal expansion of the inner cylinder and that of the outer cylinder may lead to breakage of a part (joint part) at which the inner cylinder and the outer cylinder are joined together in the opening, and thus to damage to the vacuum heat-insulating container.

The present disclosure provides a vacuum heat-insulating container that can prevent damage to the joint part of the outer cylinder and the inner cylinder upon thermal expansion of the inner cylinder, and that has a sufficiently enhanced heat insulation property.

The present disclosure is a vacuum heat-insulating container that includes an outer cylinder having a bottom and an inner cylinder having a bottom and disposed inside the outer cylinder, with a vacuum space formed between the outer cylinder and the inner cylinder. The inner cylinder and the outer cylinder are disposed such that an opening plane of the inner cylinder is located outward of an opening plane of the outer cylinder. The outer cylinder has a first annular wall that extends inwardly along the opening plane of the outer cylinder, and that includes a leading end portion at a distance from an outer circumferential surface of the inner cylinder. The inner cylinder has a second annular wall that extends toward the outside of the inner cylinder along the opening plane of the inner cylinder, and that faces the first annular wall. The vacuum heat-insulating container further includes an annular sealing member that is made of an elastic body having a coefficient of heat transfer lower than a coefficient of heat transfer of the outer cylinder and a coefficient of heat transfer of the inner cylinder, and that is squeezed between the first annular wall and the second annular wall so as to seal the vacuum space.

The outer cylinder and the inner cylinder are joined together through the sealing member. The sealing member is made of a material having a lower coefficient of heat transfer than the outer cylinder and the inner cylinder. The inner circumferential surface of the outer cylinder and the outer circumferential surface of the inner cylinder are in contact with the vacuum space. Thus, when the inner cylinder is subjected to heat, the heat of the inner cylinder can be prevented from being conducted to the outer cylinder. As a result, the heat insulation property of the vacuum heat-insulating container can be sufficiently enhanced. When the inner cylinder undergoes thermal expansion and the outer circumferential surface of the inner cylinder moves toward radially outside, the second annular wall moves accordingly toward radially outside. Meanwhile, the outer cylinder hardly undergoes thermal expansion, so that the first annular wall hardly moves in the radial direction. As a result, a shear stress acts on the sealing member that is squeezed between the first annular wall and the second annular wall. However, being made of an elastic body, the sealing member elastically deforms, and is therefore not damaged, under the shear stress exerted thereon in the radial direction by the thermal expansion of the inner cylinder. Thus, damage to the joint part of the outer cylinder and the inner cylinder upon thermal expansion of the inner cylinder is prevented.

The outer cylinder may be disposed such that the opening plane of the outer cylinder is oriented along a vertical direction. A restraining member that restrains the outer circumferential surface of the inner cylinder from moving toward the inner circumferential surface of the outer cylinder may be disposed at the vertically lower side of the vacuum space, and the restraining member may be made of a material having a coefficient of heat transfer lower than the coefficient of heat transfer of the outer cylinder and the coefficient of heat transfer of the inner cylinder.

In the case where the outer cylinder is disposed such that the opening plane of the outer cylinder is oriented along the vertical direction, if the inner cylinder moves vertically downward under the force of gravity and the outer circumferential surface of the inner cylinder moves toward the inner circumferential surface of the outer cylinder, the leading end portion in the first annular wall of the outer cylinder may come in contact with the outer circumferential surface of the inner cylinder. In the above vacuum heat-insulating container in which the outer cylinder is disposed such that the opening plane of the outer cylinder is oriented along the vertical direction, the restraining member that restrains the outer circumferential surface of the inner cylinder from moving toward the inner circumferential surface of the outer cylinder is disposed at the vertically lower side of the vacuum space. Thus, it is possible to prevent the outer circumferential surface of the inner cylinder from coming in contact with the leading end portion in the first annular wall of the outer cylinder and thereby impairing the heat insulation performance of the vacuum heat-insulating container.

Moreover, a surface of the restraining member facing the inner cylinder may have a low-friction part in which a frictional force is smaller than a frictional force in the other part.

The inner cylinder undergoes thermal expansion when subjected to heat, but the heat of the inner cylinder is hardly conducted to the outer cylinder that is insulated from the inner cylinder, so that the outer cylinder hardly undergoes thermal expansion. Specifically, when subjected to heat, the inner cylinder extends in a longitudinal direction of the vacuum heat-insulating container, while the outer cylinder does not extend in the longitudinal direction of the vacuum heat-insulating container. Therefore, when the inner cylinder is subjected to heat and undergoes thermal expansion, friction occurs between the outer circumferential surface of the inner cylinder and the surface of the restraining member facing the outer circumferential surface of the inner cylinder. If the surface of the restraining member facing the outer circumferential surface of the inner cylinder has the low-friction part, the friction occurring between the outer circumferential surface of the inner cylinder and the surface of the restraining member facing the outer circumferential surface of the inner cylinder when the inner cylinder is subjected to heat can be reduced.

A surface of the restraining member facing the outer circumferential surface of the inner cylinder may have a low-friction part having a coefficient of friction lower than a coefficient of friction of the restraining member.

The restraining member may have an arc cross-sectional shape and have a predetermined width in the longitudinal direction of the vacuum heat-insulating container.

According to the present disclosure, it is possible to prevent damage to the joint part of the outer cylinder and the inner cylinder upon thermal expansion of the inner cylinder, and to sufficiently enhance the heat insulation property.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment 1

Figure 1:
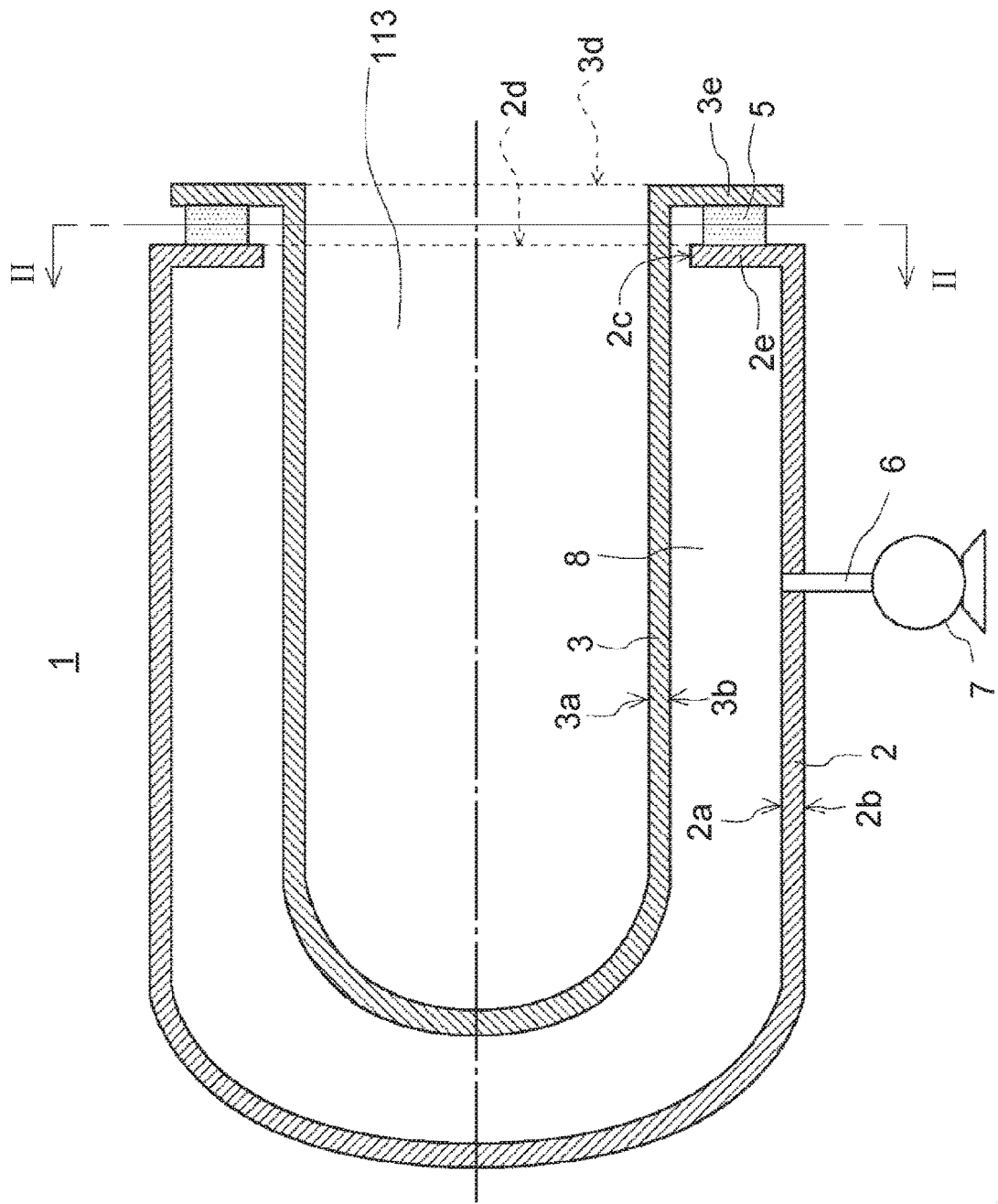
FIG. 1 is a schematic view illustrating the configuration of a vacuum heat-insulating container according to Embodiment 1.
Figure 2:
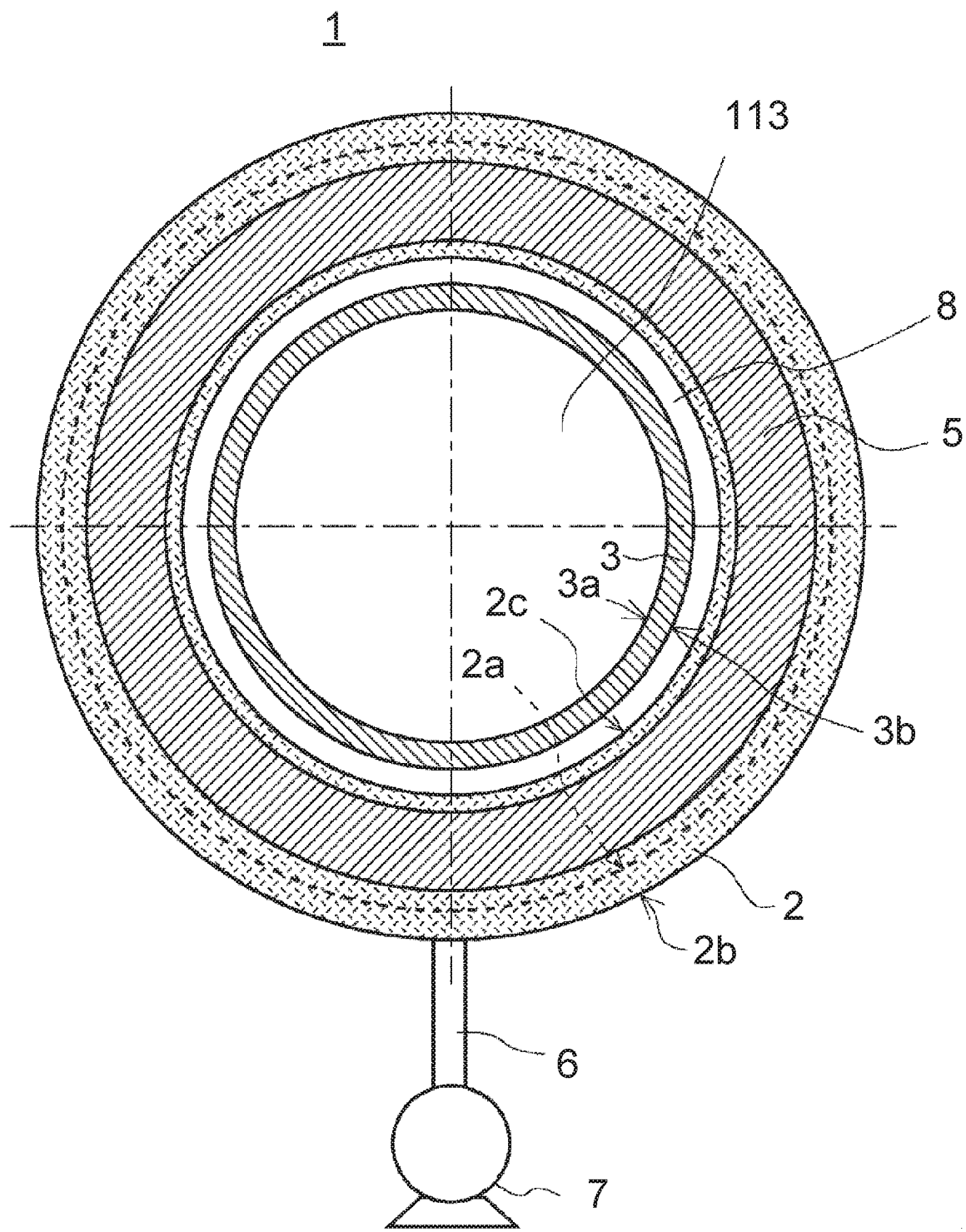
FIG. 2 is a sectional view taken along the line II-II of FIG. 1.

Embodiment 1 of the present disclosure will be described below with reference to the drawings. First, the configuration of a vacuum heat-insulating container 1 according to this embodiment will be described with reference to FIG. 1 and FIG. 2. FIG. 1 is a schematic view illustrating the configuration of the vacuum heat-insulating container 1. FIG. 2 is a sectional view taken along the line II-II of FIG. 1. As shown in FIG. 1 and FIG. 2, the vacuum heat-insulating container 1 includes an outer cylinder 2 having a bottom and an inner cylinder 3 having a bottom and disposed inside the outer cylinder 2. The inner cylinder 3 and the outer cylinder 2 are disposed such that an opening plane 3d of the inner cylinder 3 is located outward of an opening plane 2d of the outer cylinder 2.

For example, the outer cylinder 2 and the inner cylinder 3 are made of stainless steel or of iron and steel. The outer cylinder 2 has a first annular wall 2e that extends inwardly along the opening plane 2d of the outer cylinder 2, and that includes a leading end portion 2c at a distance from an outer circumferential surface 3b of the inner cylinder 3. The inner cylinder 3 has a second annular wall 3e that extends toward outside along the opening plane 3d of the inner cylinder 3 and faces the first annular wall 2e.

A sealing member 5 has an annular shape and is made of an elastic body having a lower coefficient of heat transfer than the outer cylinder 2 and the inner cylinder 3. For example, the sealing member 5 is made of a silicone resin or a Teflon® resin. The sealing member 5 is squeezed between the first annular wall 2e and the second annular wall 3e so as to seal a space between the outer cylinder 2 and the inner cylinder 3. In this state, the hermetically closed space between the outer cylinder 2 and the inner cylinder 3 is evacuated by a vacuum pump 7 through a port 6 provided in a side surface of the outer cylinder 2, so that a vacuum space 8 is formed between the outer cylinder 2 and the inner cylinder 3.

Outside air is present outside the outer cylinder 2, and a housing space 113 inside the inner cylinder 3 is a space to be heated. Thus, an outer circumferential surface 2b of the outer cylinder 2 is in contact with the outside air, while an inner circumferential surface 3a of the inner cylinder 3 is in contact with the housing space 113 that is a space to be heated. The outer cylinder 2 and the inner cylinder 3 are in contact with each other through only the sealing member 5 that is made of a material having a lower coefficient of heat transfer than the outer cylinder 2 and the inner cylinder 3. Moreover, an inner circumferential surface 2a of the outer cylinder 2 and the outer circumferential surface 3b of the inner cylinder 3 are in contact with the vacuum space 8. Thus, when the inner cylinder 3 is subjected to heat from the housing space 113, the heat of the inner cylinder 3 can be prevented from being conducted to the outer cylinder 2. If the vacuum heat-insulating container 1 is configured as has been described above, the heat insulation property of the vacuum heat-insulating container 1 can be sufficiently enhanced.

Figure 3:
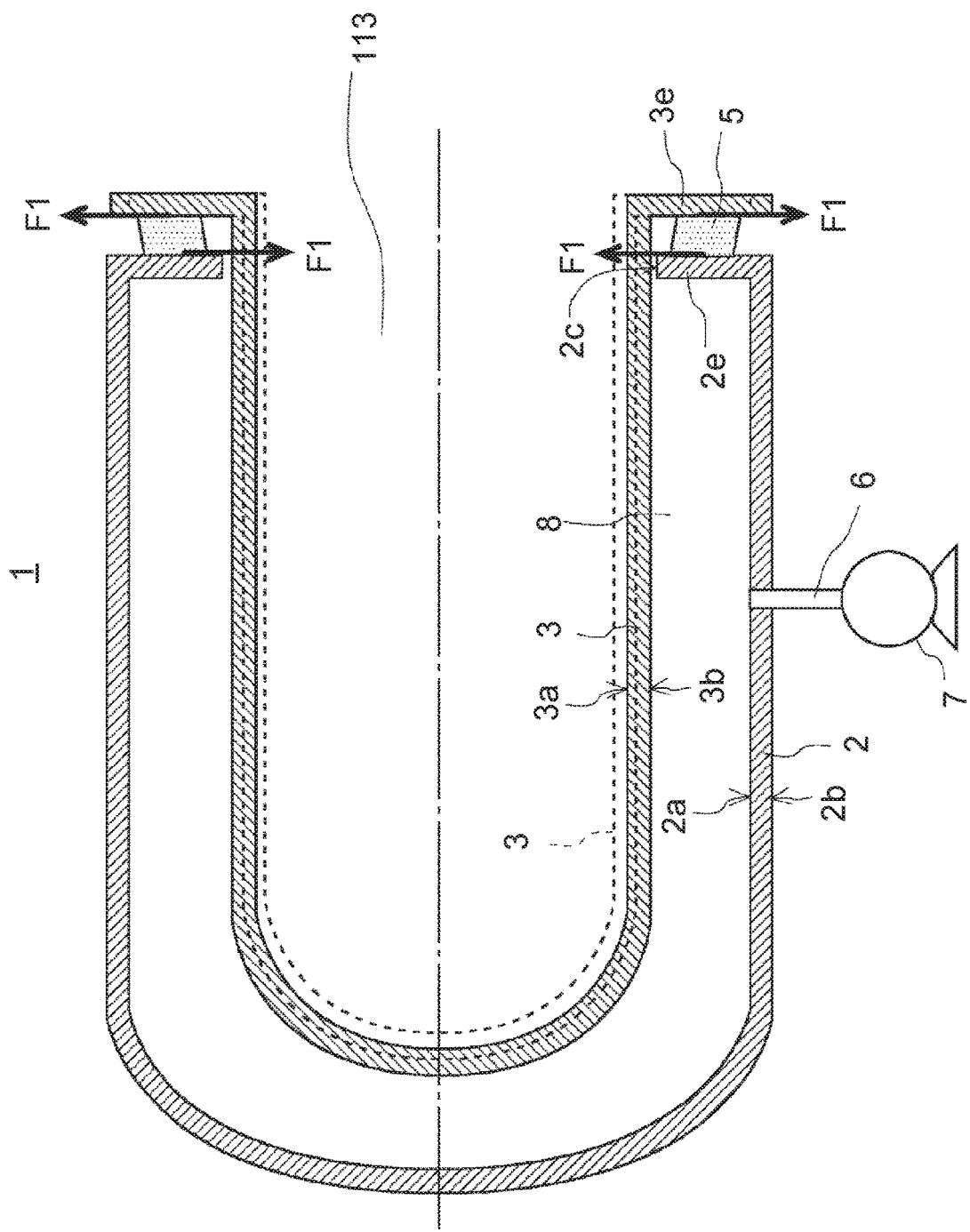
FIG. 3 is a schematic view illustrating a state where an inner cylinder has been subjected to heat from a housing space in the vacuum heat-insulating container according to Embodiment 1.

FIG. 3 is a schematic view illustrating a state where the inner cylinder 3 has been subjected to heat from the housing space 113. Here, the dashed lines in FIG. 3 indicate the inner cylinder 3 before being subjected to heat. As shown in FIG. 3, the inner cylinder 3 undergoes thermal expansion, so that the outer circumferential surface 3b of the inner cylinder 3 moves toward radially outside. Accordingly, the second annular wall 3e also moves toward radially outside. Meanwhile, the outer cylinder 2 hardly undergoes thermal expansion, so that the first annular wall 2e hardly moves in the radial direction. As a result, a shear stress F1 acts in the radial direction on the sealing member 5 that is squeezed between the first annular wall 2e and the second annular wall 3e. However, being made of an elastic body, the sealing member 5 elastically deforms, and is therefore not damaged, under the shear stress exerted thereon in the radial direction by the thermal expansion of the inner cylinder 3. Thus, damage to a joint part of the outer cylinder 2 and the inner cylinder 3 upon thermal expansion of the inner cylinder 3 can be prevented.

Figure 4:
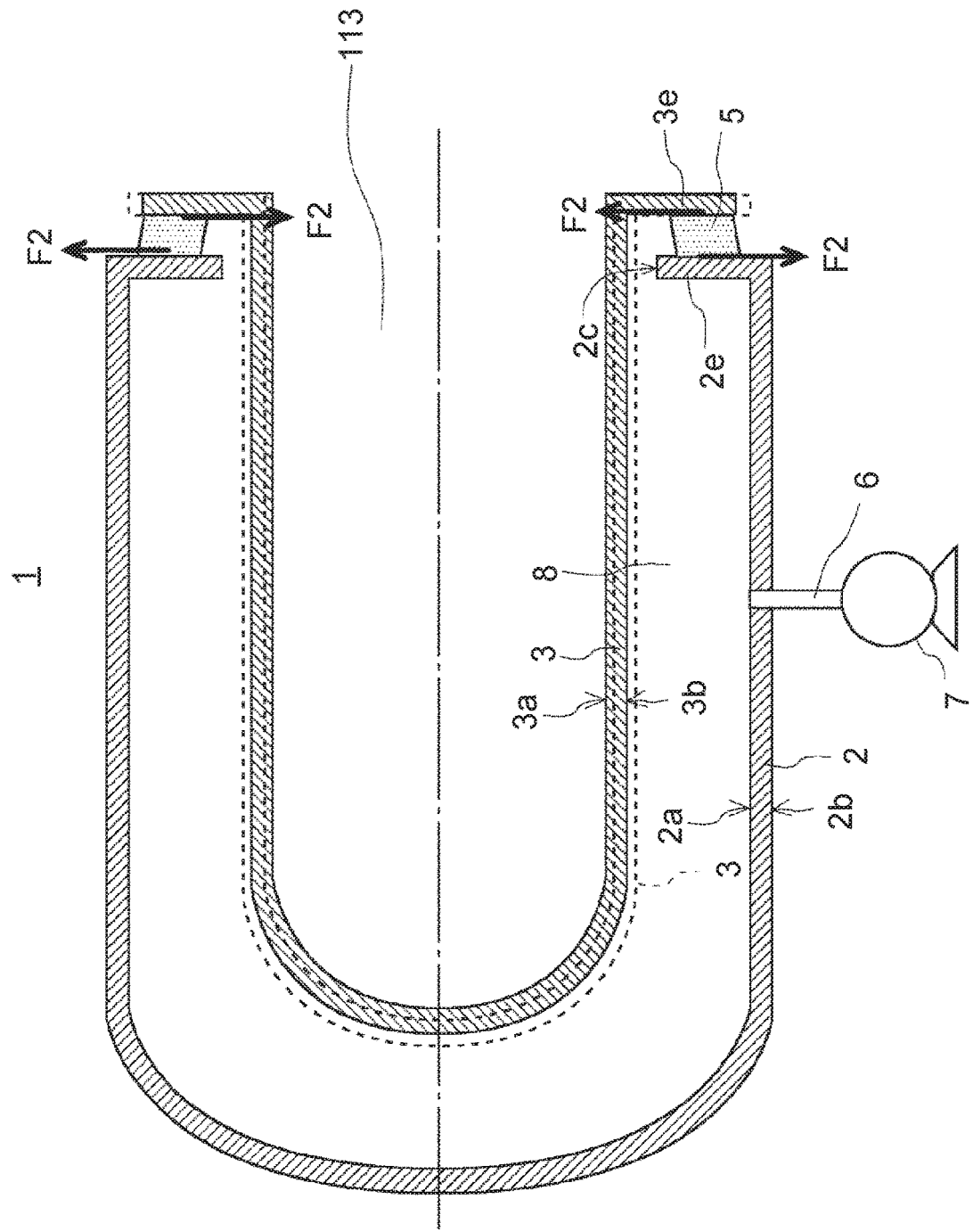
FIG. 4 is a schematic view illustrating a state where heat of the inner cylinder has been taken away by the housing space in the vacuum heat-insulating container according to Embodiment 1.

In the above embodiment, the housing space inside the inner cylinder of the vacuum heat-insulating container has been described as a space to be heated. However, also when the housing space is a space to be cooled, damage to the vacuum heat-insulating container 1 due to thermal contraction can be similarly prevented. FIG. 4 is a schematic view illustrating a state where heat of the inner cylinder 3 has been taken away by the housing space 113 that is a space to be cooled. The dashed lines in FIG. 4 indicate the inner cylinder 3 before the heat is taken away. As shown in FIG. 4, the inner cylinder 3 undergoes thermal contraction, so that the outer circumferential surface 3b of the inner cylinder 3 moves toward radially inside. Accordingly, the second annular wall 3e also moves toward radially inside. Meanwhile, the outer cylinder 2 hardly undergoes thermal contraction, so that the first annular wall 2e hardly moves in the radial direction. As a result, a shear stress F2 acts on the sealing member 5 that is squeezed between the first annular wall 2e and the second annular wall 3e. However, being made of an elastic body, the sealing member 5 elastically deforms, and is therefore not damaged, under the shear stress exerted thereon in the radial direction by the thermal contraction of the inner cylinder 3. Thus, damage to the joint part of the outer cylinder 2 and the inner cylinder 3 upon thermal contraction of the inner cylinder 3 can be prevented.

As the sealing member 5 is fixed in close contact with the cylinders, it is not necessary to fix the sealing member 5 with an adhesive etc. Thus, manufacturing the vacuum heat-insulating container 1 does not require the process of bonding the sealing member 5 to the outer cylinder 2 and the inner cylinder 3, which makes the manufacturing of the vacuum heat-insulating container 1 easier. Moreover, with the sealing member 5 easily replaceable, the maintainability of the vacuum heat-insulating container 1 is also improved.

In the above embodiment, the outer cylinder 2 is disposed such that the opening plane 2d of the outer cylinder 2 is oriented along a vertical direction, i.e., the vacuum heat-insulating container 1 is placed horizontally. However, the position of the vacuum heat-insulating container 1 is not limited to this example. The outer cylinder 2 may be disposed such that the opening plane 2d of the outer cylinder 2 is oriented along a horizontal direction, i.e., the vacuum heat-insulating container 1 may be disposed vertically.

Embodiment 2

Embodiment 2 of the present disclosure will be described below with reference to the drawings. Parts that are the same as in Embodiment 1 will be denoted by the same reference signs while description thereof will be omitted. First, the schematic configuration of a vacuum heat-insulating container 101 according to this embodiment will be described with reference to FIG. 5 and FIG. 6.

Figure 5:
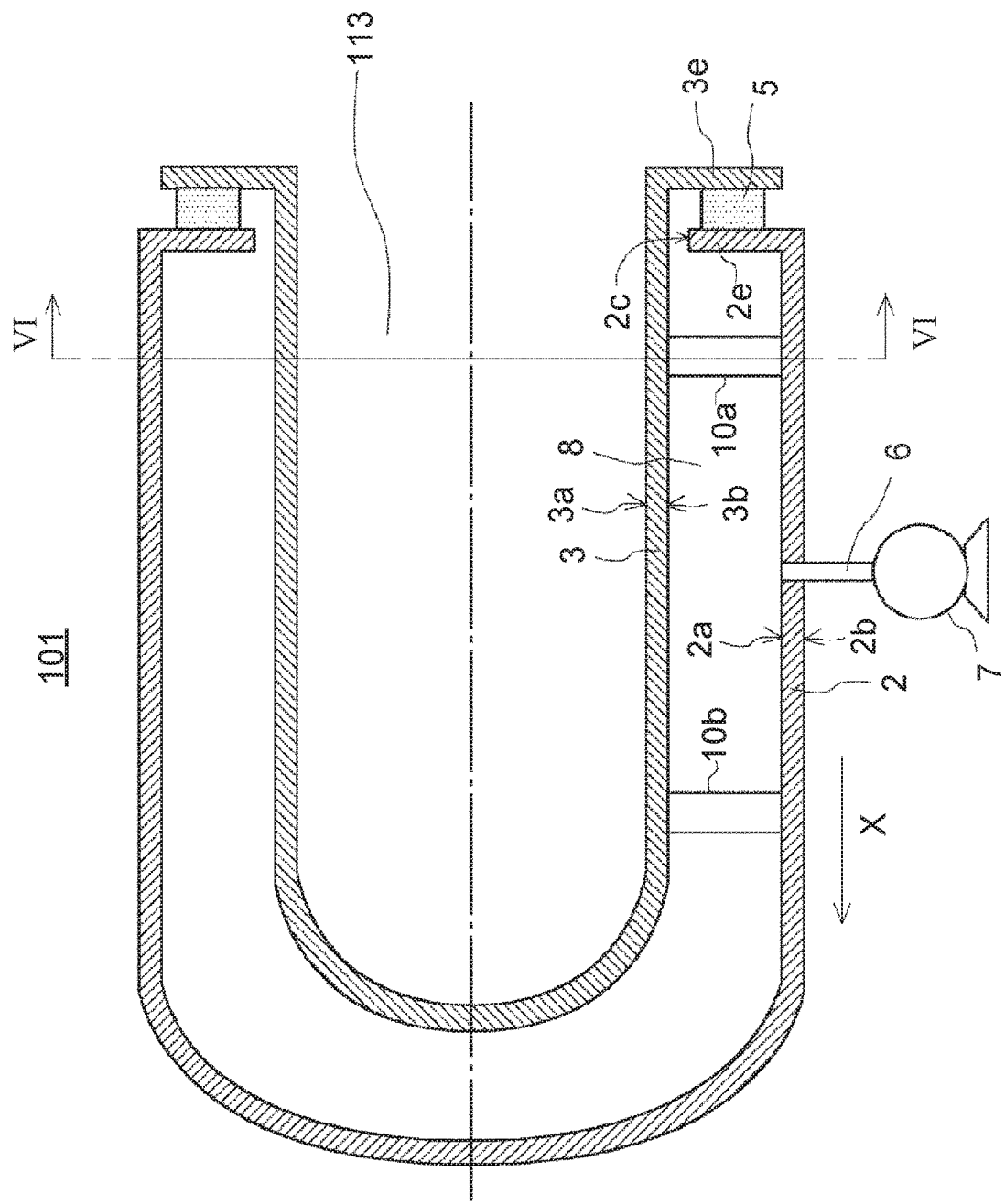
FIG. 5 is a schematic view showing the schematic configuration of a vacuum heat-insulating container according to Embodiment 2.
Figure 6:
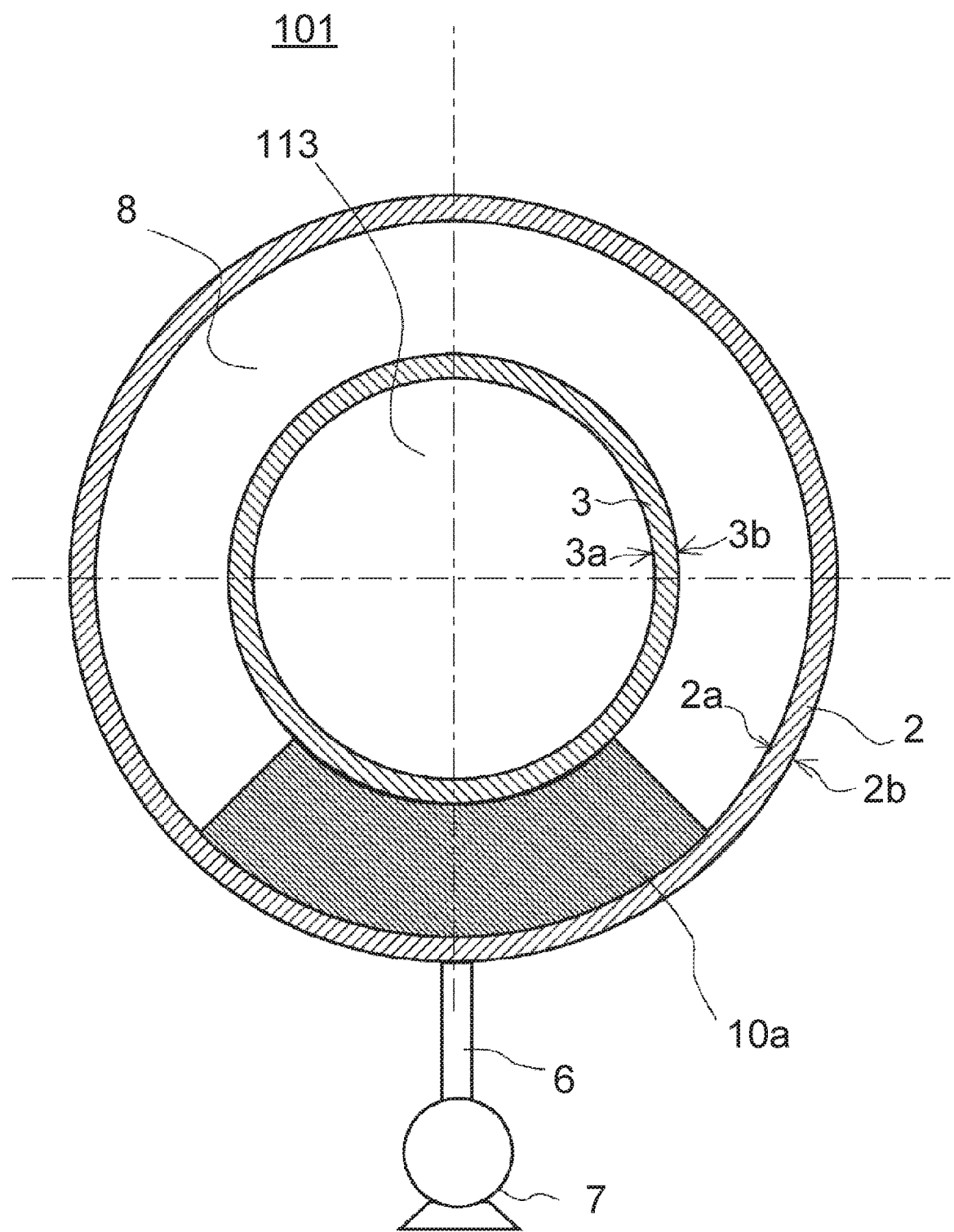
FIG. 6 is a sectional view taken along the line VI-VI of FIG. 5.

FIG. 5 is a schematic view showing the schematic configuration of the vacuum heat-insulating container 101. FIG. 6 is a sectional view taken along the line VI-VI of FIG. 5. As shown in FIG. 5 and FIG. 6, the configuration of the vacuum heat-insulating container 101 is basically the same as that of the vacuum heat-insulating container 1 described using FIG. 1 in Embodiment 1. In the vacuum heat-insulating container 101, the outer cylinder 2 is disposed such that the opening plane 2d of the outer cylinder 2 is oriented along the vertical direction, and, unlike in the vacuum heat-insulating container 1 according to Embodiment 1, restraining members 10a, 10b that restrain the outer circumferential surface 3b of the inner cylinder 3 from moving toward the inner circumferential surface 2a of the outer cylinder 2 are disposed at a vertically lower side of the vacuum space 8. The restraining members 10a, 10b are made of a material having a lower coefficient of heat transfer than the outer cylinder 2 and the inner cylinder 3.

The restraining members 10a, 10b have an arc shape when seen in a cross section along the line VI-VI of FIG. 5 (see FIG. 6), and have a predetermined width in a longitudinal direction of the vacuum heat-insulating container 101 (the direction indicated by the arrow X in FIG. 5). The restraining members 10a, 10b are each in contact with the outer circumferential surface 3b of the inner cylinder 3 and the inner circumferential surface 2a of the outer cylinder 2, and support the load of the inner cylinder 3 as well as restrain the outer circumferential surface 3b of the inner cylinder 3 from moving toward the inner circumferential surface 2a of the outer cylinder 2. Thus, a clearance between the outer circumferential surface 3b of the inner cylinder 3 and the inner circumferential surface 2a of the outer cylinder 2 is maintained.

In the case where the outer cylinder 2 is disposed such that the opening plane 2d of the outer cylinder 2 is oriented along the vertical direction, i.e., the vacuum heat-insulating container 1 is disposed horizontally, if the inner cylinder 3 moves vertically downward under the force of gravity and the outer circumferential surface 3b of the inner cylinder 3 moves toward the inner circumferential surface 2a of the outer cylinder 2, the leading end portion 2c in the first annular wall 2e of the outer cylinder 2 may come in contact with the outer circumferential surface 3b of the inner cylinder 3. Also in such a case, disposing the restraining members 10a, 10b that restrain the outer circumferential surface 3b of the inner cylinder 3 from moving toward the inner circumferential surface 2a of the outer cylinder 2 at the vertically lower side of the vacuum space 8 can prevent the leading end portion 2c in the first annular wall 2e of the outer cylinder 2 from coming in contact with the outer circumferential surface 3b of the inner cylinder 3.

Since the restraining members 10a, 10b serve to support the load of the inner cylinder 3, a material strong enough to withstand the load of the inner cylinder 3 can be selected as the material of the restraining members 10a, 10b. For example, glass-fiber-reinforced calcium silicate can be used as the material of the restraining members 10a, 10b.

A surface of each of the restraining members 10a, 10b facing the outer circumferential surface 3b of the inner cylinder 3 may have a low-friction part in which a frictional force is smaller than a frictional force in the other part. In other words, a surface of each of the restraining members 10a, 10b facing the outer circumferential surface 3b of the inner cylinder 3 may have a low-friction part having a coefficient of friction lower than a coefficient of friction of the restraining members 10a, 10b. For example, a member having a low coefficient of friction, such as Tribo-Tape manufactured by igus k. k., may be disposed on the surface of each of the restraining members 10a, 10b facing the outer circumferential surface 3b of the inner cylinder 3.

The inner cylinder 3 undergoes thermal expansion when subjected to heat, but the heat of the inner cylinder 3 is hardly conducted to the outer cylinder 2 that is insulated from the inner cylinder 3, so that the outer cylinder 2 hardly undergoes thermal expansion. Specifically, when subjected to heat, the inner cylinder 3 extends in the longitudinal direction of the vacuum heat-insulating container 101, while the outer cylinder 2 hardly extends in the longitudinal direction of the vacuum heat-insulating container 101. Therefore, when the inner cylinder 3 is subjected to heat and undergoes thermal expansion, friction occurs between the outer circumferential surface 3b of the inner cylinder 3 and the surfaces of the restraining members 10a, 10b facing the outer circumferential surface 3b of the inner cylinder 3. If the surface of each of the restraining members 10a, 10b facing the outer circumferential surface 3b of the inner cylinder 3 has the low-friction part, the friction occurring between the outer circumferential surface 3b of the inner cylinder 3 and the surfaces of the restraining members 10a, 10b facing the outer circumferential surface 3b of the inner cylinder 3 when the inner cylinder 3 is subjected to heat can be reduced.

Moreover, if the surface of each of the restraining members 10a, 10b facing the outer circumferential surface 3b of the inner cylinder 3 has the low-friction part, it is possible to reduce the risk of damage to the outer circumferential surface 3b of the inner cylinder 3 due to friction that is caused by the restraining members 10a, 10b coming in contact with the outer circumferential surface 3b of the inner cylinder 3 in the process of inserting the inner cylinder 3 into the outer cylinder 2 during the manufacturing of the vacuum heat-insulating container 101.

In the vacuum heat-insulating container 101 shown in FIG. 5, the restraining members are disposed at two positions in the longitudinal direction of the vacuum heat-insulating container 101, between the inner circumferential surface 2a of the outer cylinder 2 and the outer circumferential surface 3b of the inner cylinder 3. However, the number of the restraining members is not limited to this example. For example, the restraining members may be disposed at two or more positions in the longitudinal direction of the vacuum heat-insulating container 101, between the inner circumferential surface 2a of the outer cylinder 2 and the outer circumferential surface 3b of the inner cylinder 3. The cross-sectional shape of the restraining member is not limited to the arc shape shown in FIG. 6, either. The restraining member may have a cross-sectional shape other than an arc cross-sectional shape, as long as the restraining member can restrain the outer circumferential surface 3b of the inner cylinder 3 from moving toward the inner circumferential surface 2a of the outer cylinder 2 so that the leading end portion 2c in the first annular wall 2e does not come in contact with the outer circumferential surface 3b of the inner cylinder 3 upon thermal expansion of the inner cylinder 3.

As has been described above, disposing the restraining members inside the vacuum space 8 between the inner circumferential surface 2a of the outer cylinder 2 and the outer circumferential surface 3b of the inner cylinder 3 can prevent the outer circumferential surface 3b of the inner cylinder 3 from coming in contact with the leading end portion 2c in the first annular wall 2e of the outer cylinder 2 and thereby impairing the heat insulation performance of the vacuum heat-insulating container 101.

The present disclosure is not limited to the above embodiments but can be modified as appropriate within the scope of the gist of the disclosure.

What is claimed is:

1. A vacuum heat-insulating container comprising:
an outer cylinder having a bottom, and
an inner cylinder having a bottom and disposed inside the outer cylinder, wherein
a vacuum space is formed between the outer cylinder and the inner cylinder,
the inner cylinder and the outer cylinder are disposed such that an opening plane of the inner cylinder is located outward of an opening plane of the outer cylinder,
the outer cylinder has a first annular wall that extends inwardly along the opening plane of the outer cylinder, and that includes a leading end portion at a distance from an outer circumferential surface of the inner cylinder,
the inner cylinder has a second annular wall that extends toward an outside of the inner cylinder along the opening plane of the inner cylinder, and that faces the first annular wall, and
the vacuum heat-insulating container includes an annular sealing member that is made of an elastic material having a coefficient of heat transfer lower than a coefficient of heat transfer of the outer cylinder and a coefficient of heat transfer of the inner cylinder, and that is squeezed between the first annular wall and the second annular wall so as to seal the vacuum space, wherein
the outer cylinder is disposed such that the opening plane of the outer cylinder is oriented along a vertical direction,
a restraining member that restrains the outer circumferential surface of the inner cylinder from moving toward an inner circumferential surface of the outer cylinder is disposed at a vertically lower side of the vacuum space,
the restraining member is made of a material having a coefficient of heat transfer lower than the coefficient of heat transfer of the outer cylinder and the coefficient of heat transfer of the inner cylinder, and
a surface of the restraining member facing the inner cylinder has a low-friction part in which a frictional force is smaller than a frictional force in remaining parts of the restraining member.

2. A vacuum heat-insulating container comprising:
an outer cylinder having a bottom, and
an inner cylinder having a bottom and disposed inside the outer cylinder,
wherein
a vacuum space is formed between the outer cylinder and the inner cylinder,
the inner cylinder and the outer cylinder are disposed such that an opening plane of the inner cylinder is located outward of an opening plane of the outer cylinder,
the outer cylinder has a first annular wall that extends inwardly along the opening plane of the outer cylinder, and that includes a leading end portion at a distance from an outer circumferential surface of the inner cylinder,
the inner cylinder has a second annular wall that extends toward an outside of the inner cylinder along the opening plane of the inner cylinder, and that faces the first annular wall, and
the vacuum heat-insulating container includes an annular sealing member that is made of an elastic material having a coefficient of heat transfer lower than a coefficient of heat transfer of the outer cylinder and a coefficient of heat transfer of the inner cylinder, and that is squeezed between the first annular wall and the second annular wall so as to seal the vacuum space,
the outer cylinder is disposed such that the opening plane of the outer cylinder is oriented along a vertical direction,
a restraining member that restrains the outer circumferential surface of the inner cylinder from moving toward an inner circumferential surface of the outer cylinder is disposed at a vertically lower side of the vacuum space,
the restraining member is made of a material having a coefficient of heat transfer lower than the coefficient of heat transfer of the outer cylinder and the coefficient of heat transfer of the inner cylinder, and a surface of the restraining member facing the outer circumferential surface of the inner cylinder has a low-friction part having a coefficient of friction lower than a coefficient of friction of remaining parts of the restraining member.

3. The vacuum heat-insulating container according to claim 1, wherein the restraining member has an arc cross-sectional shape.

4. The vacuum heat-insulating container according to claim 2, wherein the restraining member has an arc cross-sectional shape.

* * * * *